United States Patent [19]

Menzel

[11] Patent Number: 4,680,944
[45] Date of Patent: Jul. 21, 1987

[54] APPARATUS FOR THE PREPARATION OF ICE CREAM, MILKSHAKES, SORBET, FROZEN DESSERTS AND THE LIKE FROM A PUMPABLE STARTING MIXTURE

[75] Inventor: Waldemar Menzel, Kulmbach-Burghaig, Fed. Rep. of Germany

[73] Assignee: Lumen GmbH Nährmittel - und Maschinenfabrik, Kulmbach, Fed. Rep. of Germany

[21] Appl. No.: 938,728

[22] Filed: Dec. 5, 1986

[30] Foreign Application Priority Data

Dec. 18, 1985 [DE] Fed. Rep. of Germany ....... 3544802

[51] Int. Cl.4 .............................................. A23G 9/12
[52] U.S. Cl. ...................................... 62/342; 99/470; 165/61; 366/149
[58] Field of Search ................ 62/342, 343; 426/521; 366/137, 149; 99/453, 455, 470; 165/61, 63, 64

[56] References Cited

U.S. PATENT DOCUMENTS

| | | | |
|---|---|---|---|
| 3,402,567 | 9/1968 | Menzel | 62/306 |
| 3,665,722 | 5/1972 | Cornelius | 62/68 |
| 3,811,494 | 5/1974 | Menzel | 165/65 |
| 3,930,535 | 1/1976 | Menzel | 165/27 |
| 4,057,391 | 11/1977 | Yamaguchi | 426/521 X |
| 4,522,041 | 6/1985 | Menzel | 62/342 |

Primary Examiner—William E. Tapolcai
Attorney, Agent, or Firm—Browdy and Neimark

[57] ABSTRACT

An apparatus for the preparationof ice cream, milkshakes, sorbet, frozen desserts and the like, from a pumpable starting mixture, comprises a storage container for the starting mixture and a cooling or freezing cylinder communicating with it via a supply conduit. A rotatably drivable stirring and scraping mechanism is disposed in the cylinder and the supply conduit discharges into an inlet chamber located on one end of the cylinder, a discharge valve being provided on the other end of the cylinder. Only the cylinder is provided with a heater for pasteurizing the starting mixture, and a thermostat is provided for limiting the wall temperature of the cylinder. Devices for transporting the starting mixture from the inlet chamber to the discharge valve are provided. To attain completely satisfactory results from the bacteriological standpoint as well as to prevent changes in flavor, the apparatus provides that a connecting conduit that can be blocked by a valve is provided between the storage container and the cylinder, discharging from the end region of the cylinder adjacent to the discharge valve.

4 Claims, 3 Drawing Figures

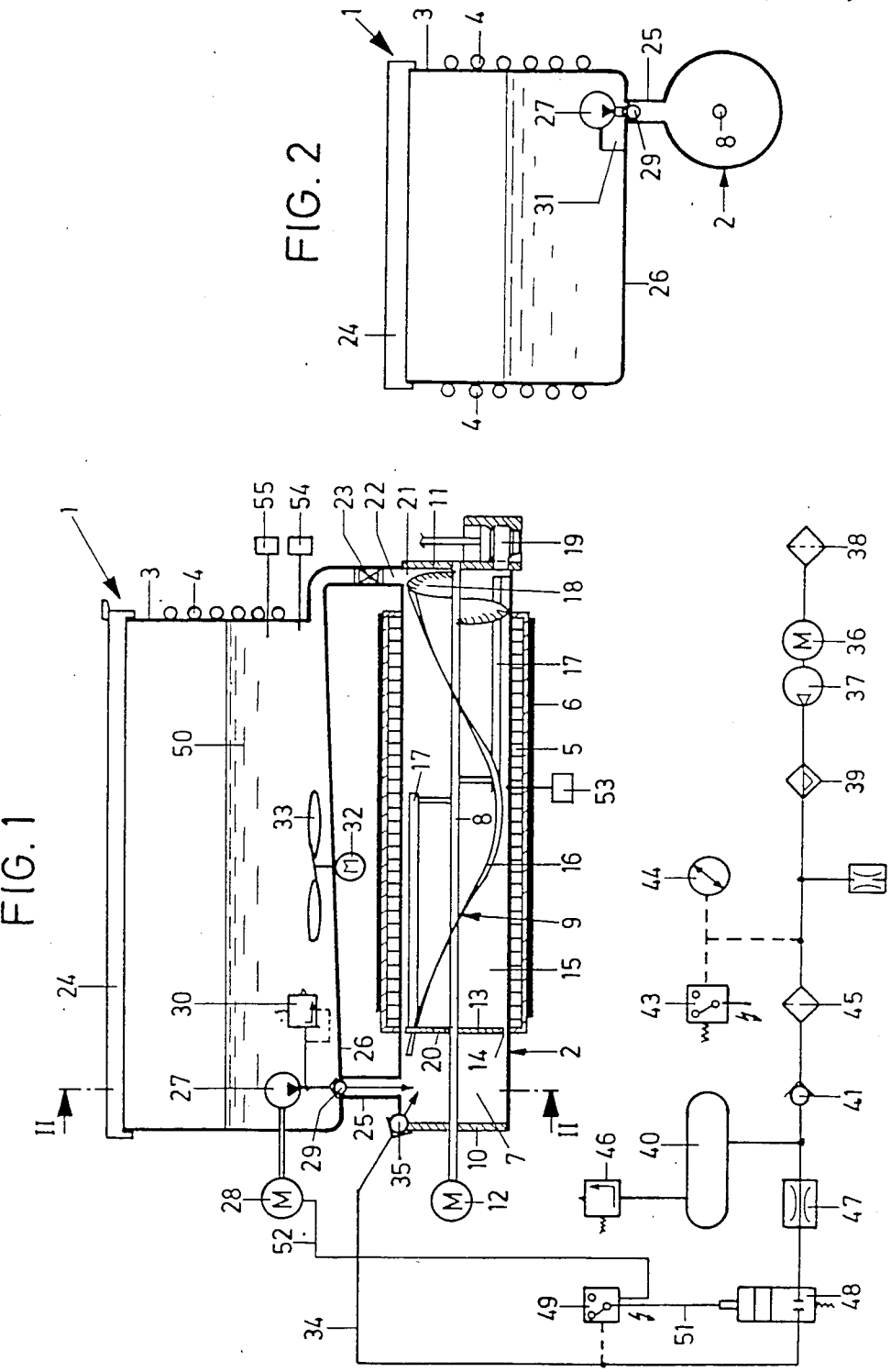

4,680,944

APPARATUS FOR THE PREPARATION OF ICE CREAM, MILKSHAKES, SORBET, FROZEN DESSERTS AND THE LIKE FROM A PUMPABLE STARTING MIXTURE

FIELD OF THE INVENTION

The present invention relates to an apparatus for preparing ice cream, milkshakes, sorbet, frozen desserts and the like from a starting mixture that can be pumped. The apparatus comprises a storage container for the mixture and a cooling or freezing cylinder which communicates with the storage container via a supply conduit and contains a rotatable stirring and scraping apparatus. The supply conduit discharges into an inlet chamber on one end of the freezing cylinder, and a discharge valve is provided on the other end of the cylinder. A heater for pasteurizing the mixture is provided for the cylinder only, and a thermostat is provided to limit the wall temperature of the freezing cylinder. Devices are also provided for carrying the starting mixture from the inlet chamber to the discharge valve.

BACKGROUND OF THE INVENTION

An apparatus for preparing ice cream and the like, as disclosed in German Pat. No. 23 13 714 (corresponding to U.S. Pat. No. 3,930,535), the starting mixture located in the freezing cylinder and in the storage container is pasteurized—typically daily, after the close of business—by using a heater attached to the cylinder wall to heat the inner wall of the freezing cylinder to a temperature just above the temperature of vaporization of water, causing some of the water in the starting mixture to evaporate and to rise into the storage container through the supply conduit, which is embodied with a large cross section. As a result of this rising steam, the starting mixture located in the storage container is heated to the temperature of pasteurization as well. In apparatus as disclosed in the prior art, satisfactory pasteurization of the starting mixture located in the storage container and freezing cylinder is achieved, and in contrast to earlier equipment the starting mixture does not scorch, that is, burn onto the wall of the storage container. However, because localized heating to approximately 100° C. is necessary, alterations in flavor or taste occur, especially in starting mixtures containing milk. In particular, the starting mixture takes on a caramel-like taste.

SUMMARY OF THE INVENTION

It is accordingly the object of the present invention to embody an apparatus of the above type such that during pasteurization, completely satisfactory results are achieved from the bacteriological standpoint, on the one hand, and yet changes in flavor are avoided.

This object is attained in accordance with the present invention by providing means to enable recirculation of the entire contents of the cooling or freezing cylinder and of the storage container during pasteurization. Because the starting mixture is supplied from the storage container—in a known manner—at one end of the cylinder, and the return of this mixture from the other end of the cylinder takes place via the connecting conduit that is closed during normal operation, the entire starting mixture is recirculated continuously. The dwell time at any particular region on the inner wall of the cylinder is very short, which precludes scorching. Because of the continuous recirculation, heat transmission in the vicinity of the inner cylinder wall is very high, and so the cylinder wall need be heated only to a temperature that is slightly above the temperature of pasteurization, which is approximately 72° C. Localized overheating in the starting mixture does not occur, so that the pasteurization temperature of 72° C. is not exceeded locally either, so that alterations in flavor can be precluded.

An embodiment of the thermostat that limits the cylinder wall temperature is also disclosed.

For recirculating the mixture during pasteurization, it may be sufficient merely to turn on the stirring and scraping mechanism, which also exerts a pumping effect upon the discharge valve. However, it is particularly advantageous to provide a separate pump in the storage container, because this makes for more extensive recirculation.

German Pat. No. 21 39 917 (corresponding to U.S. Pat. No. 3,811,494), relating to an apparatus for preparing ice cream having a spatially separate storage container and freezing cylinder, discloses that it is known to provide not only a feed line connecting the storage container with an inlet chamber of the cylinder but also a return line which also discharges into the inlet chamber, which enables continuous or intermittent pumping of the starting mixture back and forth between the storage container and the freezing cylinder. The purpose of this provision is to prevent the propagation of bacteria in the feed line during idle periods. This also makes it possible to pasteurize the entire supply of starting mixture, such as an ice cream mix, using only one heater, for instance, provided on the freezing cylinder. However, the basic concept of including the entire contents of the freezing cylinder in a recirculation process in a specified way is neither disclosed nor suggested by this earlier disclosure.

U.S. Pat. No. 3,665,722, discloses an apparatus for preparing partly frozen beverages. Here, a storage container communicates via a line with a freezing cylinder located below it. The freezing cylinder communicates with the storage container via a return line having a magnetic valve. This magnetic valve opens whenever the liquid in the storage cylinder has exceeded a certain temperature. Thus these connecting lines serve to assure cooling of the beverage in the storage container. The contents of the freezing cylinder are not integrated into the recirculation system. The problems of an alteration of flavor during pasteurization do not play any role in this apparatus.

Further advantages, features and details of the invention will become apparent from the ensuing description of exemplary embodiments, taken in conjunction with the drawings.

BRIEF DESCRIPTION OF THE DRAWINGS

FIG. 1 is a schematic illustration of an apparatus according to the invention, seen in a vertical longitudinal section;

FIG. 2 is a cross section taken along the line II—II of FIG. 1; and

DESCRIPTION OF THE PREFERRED EMBODIMENTS

Figure 3:
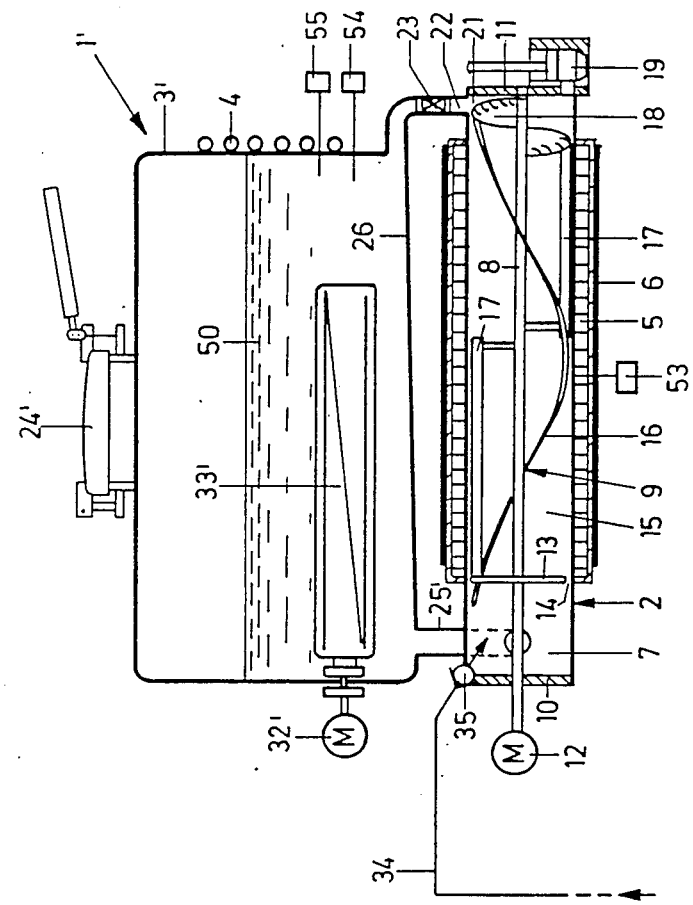
FIG. 3 is a schematic illustration of a modified embodiment of the apparatus according to the invention, again in a vertical longitudinal section.

As shown in FIGS. 1 and 2, a storage container 1 is disposed above a horizontal cooling or freezing cylinder 2—in a conventional fashion—and with it forms a unit. The side walls 3 of the storage container 1 are provided with a cooling tube 4, which extends approximately helically about the side walls 3 and is only schematically illustrated.

The cylinder 2 is surrounded by a cooling jacket 5 through which a coolant can be pumped. The cooling jacket 5 itself is surrounded in turn by a heating jacket 6. The cooling jacket 5 and heating jacket 6 extend substantially over the entire length of the cylinder 2, with the exception of an area located on one end (seen on the left in FIG. 1), in which an inlet chamber 7 of the cylinder 2 is located. The cylinder 2 is coaxially penetrated by a shaft 8 of a stirring and scraping mechanism 9, which is rotatably supported in end walls 10, 11 of the cylinder 2 and extends out of one end (on the left in FIG. 1). The stirring and scraping mechanism 9 is driven on this end by an electric motor 12.

A disk 13 is attached to the shaft 8, leaving only a very narrow gap 14 with respect to the wall of the cylinder 2. This disk 13 divides the inlet chamber 7 from the actual cooling and/or freezing chamber 15 in the cylinder 2, this chamber 15 being surrounded by the cooling jacket 5 and heating jacket 6. A helical stirring element 16 is secured on the shaft 8 in the chamber 15. Also attached to the shaft 8 are two scraper blades 17 contacting the inner wall of the cylinder 2, which continuously scrape the ice cream mix from the inner wall of the cylinder 2. Contiguous with the helical stirrer 16, a close-pitch worm 18 is also attached to the shaft 8, its worm pitch being such as to exert a certain backpressure effect with respect to the helical stirrer 16. A discharge valve 19 is attached in front of the end wall 11 opposite the motor 12. In the disk 13 acting as a partition, there may be a through opening 20 connecting the inlet chamber 7 with the chamber 15.

The cooling and/or freezing chamber 15 communicates with the storage container 3 in the end region 21 adjacent to the discharge valve 19 or to the associated end wall 11 via a connecting conduit 22. A valve 23 is disposed in this connecting conduit 22, which is embodied by a tube.

The storage container 3, which is closable by means of a cap 24, communicates with the inlet chamber 7 of the cylinder 2 via a supply conduit 25, which is preceded by a pump 27 disposed in the storage container 1 on its bottom 26. This pump 27 is driven by an electric motor 28. The pump 27 may be a gear pump. It is preceded, in the vicinity of the supply conduit 25, by a check valve 29, which prevents a return flow of liquid from the cylinder 2, or its inlet chamber 7, to the storage container 1.

The pump 27 is also provided with an overpressure valve 30, which opens if the counterpressure coming from the inlet chamber 7 exceeds a predetermined value. In that case, the liquid to be pumped into the inlet chamber 7 from the storage container 1 is returned to the storage container 7 by a short circuit. It is conventional in the trade to equip pumps in this way.

The pump 27 has an intake fitting 31, the open end of which is in the vicinity of the bottom 26 of the storage container 1, so that there are no idle spaces in the storage container 1.

A stirrer 33 driven by an electric motor 32 is disposed on the bottom 26 of the storage container 1, continuously recirculating the liquid located in the storage container 1.

Air is introduced into the upper portion of the inlet chamber 7 via an air line 34. To prevent liquid and/or air from returning to the air line 34 from the inlet chamber 7, the air line is provided with a check valve 35, which may be embodied by what is known as a lip valve, for example. Compressed air is supplied to the air line 34 by a compressor 37 driven by an electric motor 37, the compressor 37 being preceded by an air filter 38. A compressed air dehumidifier 39 follows the compressor.

A compressed air storage container 40 is also provided in the air line 34, and a check valve 41 is disposed between this container 40 and the compressor 37. Between the compressor 37 and the check valve 41, an outlet throttle valve 42 is also provided, through which some compressed air flows out continuously. Because of the check valve 41, however, no compressed air can flow out of the compressed air storage container 40 back to the throttle valve 42. A pressure monitor 43 is also disposed in the air line 34 between the compressor 37 and the check valve 41, and it switches the compressor 37 on whenever the pressure in the air line 34 between the compressor 37 and the check valve 41 falls below a certain minimum. This minimum pressure may be on the order of 1.7 bar, for example. The compressor switches back off again whenever the pressure exceeds a predeterminable maximum pressure, such as 2.0 bar. The air pressure can be monitored visually by means of a manometer 44. The check valve 41 is also preceded by a sterile compressed air filter 45. A pressure limiting valve 46 is disposed on the compressed air storage container 40.

A throttle valve 47 and a magnetic valve 48 are disposed in the air line 34 between the compressed air storage container 40 and the check valve 34. A pressure monitor 49 is also provided between the magnetic valve 48 and the check valve 35.

The exemplary embodiment described above functions as follows:

The storage container is assumed to contain a so-called ice cream mix 50, that is, a liquid starting mixture for making ice cream or the like, and that ice cream or the like is prepared from this mixture in the cylinder 2, while air is simultaneously incorporated into it.

The ice cream mix 50 is pumped into the inlet chamber 7 of the cylinder 2 by means of the pump 27, in accordance with the pressure prevailing in the cylinder. Except for the starting up phase, when it is not constant, the pressure in the cylinder 2 varies only when servings of ice cream are drawn off by means of the discharge valve 19, and so the pump 27 is always switched on during or after the drawing of a serving of ice cream.

The air needed for aerating the ice cream is supplied via the air line 34. The quantity of air to be supplied per unit of time through the air line 34 is set at the throttle valve 47. Typically this may be done such that air is forced into the inlet chamber at a rate between 0.8 and 2.7 liters per minute. Since the output of the pump 27 per unit of time is constant and amounts for example to 2.5 liters per minute, the volumetric ratio of ice cream mix to air that is supplied per minute can be kept very accurately at a predetermined value.

If the pressure in the cylinder 2 drops because a serving of ice cream has been withdrawn, then the pressure in the line 34 between the check valve 35 and the magnetic valve 48 also drops, and so the pressure monitor 49 registers this pressure drop. If the pressure drops below a predetermined value, for instance 1.2 bar, then a signal is sent via a control line 51 for opening the magnetic valve 48, and a signal is sent for switching on the motor 28 and the pump 27 via a control line 52. Air and ice cream mix are then pumped into the inlet chamber 7 of the cylinder 2 at a predetermined quantity ratio. Once the pressure in the cylinder 2 has again attained a predetermined maximum value, for instance 1.5 bar, then by way of appropriate signals from the pressure monitor 49 the magnetic valve 48 is closed and the motor 28 of the pump 27 is switched off. This process is repeated continuously, whenever servings of ice cream are drawn off at the discharge valve 19.

The storage container 1 is unpressurized; the ice cream mix stored in it is kept chilled at a storage temperature of approximately 2° C. and is periodically recirculated by the stirrer 33, to assure a uniform temperature within the ice cream mix.

As will be understood from the foregoing, the cylinder 2 is always filled with ice cream mix or with prepared ice cream, regardless of whether only a little ice cream mix 50, or a large amount, is present in the storage container 1. Whenever the ice cream mix 50 still contained in the storage container 1 and the prepared ice cream in the cylinder 2 are to be pasteurized—typically after the close of business for the day—the supply of compressed air is shut off by the general closure of the magnetic valve 48, and the valve 23 in the connecting conduit 22 is opened. At the same time, the stirring and scraping mechanism 9 and the pump 27 are put into operation. The cooling process via the cooling tube 4 and cooling jacket 5 is also switched off, and heating by the heating jacket 6 is switched on. During the pasteurization process, the heating jacket 6 is regulated via a thermostat 53 that measures the temperature of the inner wall of the cylinder 2. The ice cream mix is moved toward the discharge valve by the helical stirrer 16 and from there is pumped back into the storage container 1 through the opened connecting conduit 22 by means of the worm 18, which during operation is used to force the servings of ice cream out through the discharge valve 19. From the storage container, the ice cream mix is pumped back into the inlet chamber 7 by means of the pump 27. Thus a continuous circulation of the ice cream mix between the storage container 1 and cylinder 2 is attained, and all the regions of the wall of the cylinder 2 are scraped. Since the ice cream mix becomes highly turbulent in the cylinder because of the stirring and scraping mechanism 9 and in particular the scraper blades 17, there is good heat transmission to the ice cream mix from the surface of the cylinder 2 that is heated by the heating jacket 6. When the ice cream mix is to be heated to approximately 72° C. for pasteurization, it is accordingly sufficient for the temperature of the inner wall of the cylinder 2 to be kept at a temperature of from 75° to 80° C. by means of the thermostat 53. This assures that the ice cream mix will not burn onto the inner wall of the cylinder 2 and take on a caramel-like flavor. As soon as all the ice cream mix 50 has attained the temperature of pasteurization, which is detected via a thermostat 54 housed in the storage container 1, the heating jacket 6 is switched off; this may be done in a delayed manner—under the control of a clock, not shown—to assure effective germicidal action in the ice cream mix 50.

The refrigeration system, not shown in the drawing, is then switched on again, and the ice cream mix 50 is chilled to the storage temperature of 2° C., via the cooling tube 4 and the cooling jacket 5. The attainment of this storage temperature is monitored via a thermostat 55 housed in the storage container 1.

For pasteurization, it is possible to double the speed of the pump 27, in order to increase the recirculation of the mixture. The quantity recirculated per unit of time between the cylinder 2 and storage container 1 is determined solely by the capacity of the pump 27.

In the embodiment of FIG. 3, elements identical to those in the embodiment of FIGS. 1 and 2 are identified by the same reference numerals. Elements that in principle are functionally the same but that differ structurally are identified by the same reference numerals, provided with a prime. Description of such elements in detail once again should therefore be unnecessary.

The apparatus of FIG. 3 has a pressure-tight storage container 1', closed off by a cap 24' that closes in a pressure-tight, airtight manner.

A roller-like stirrer 33' that is drivable by an electric motor 32' is disposed in the storage container 1'.

A supply conduit 25' discharges from the storage container 1' into the inlet chamber 7 of the cylinder 2 and is embodied by a pipe bend of relatively large cross section, which discharges into the inlet chamber approximately at the level of the shaft 8 of the stirring and scraping mechanism 9. Through this supply conduit 25', compressed air delivered via the air line 34 can rise in the storage container 1' as well, which is why the storage container must be embodied such that it is airtight and pressure-tight. The supply of compressed air may be effected in the conventional manner, for instance as shown and described in German Pat. No. 12 77 877 (corresponding to U.S. Pat. No. 3,402,567); this is not critical in the present context.

The recirculation of the ice cream mixture during pasteurization is effected solely by means of the stirring and scraping mechanism 9, including the worm 18.

For pasteurization, the valve 23 in the connecting conduit 22 is accordingly opened, resulting in the recirculation of the ice cream mix in the claimed manner. The return flow takes place freely through the supply conduit 25'. Temperature control and the termination of the pasteurization process are effected as in the foregoing embodiment.

Instead of ice cream mix, other starting mixtures can also be used, for instance for milkshake, sorbet or frozen desserts, as long as these starting mixtures are capable of being pumped, or in other words are in liquid form.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. Apparatus for the preparation of ice cream, milkshakes, sorbet, frozen desserts, and the like, from a pumpable starting mixture, comprising:
    a storage container for the starting mixture;
    a supply conduit communicating with said storage container;
    a cylinder for cooling or freezing, said cylinder communicating with said storage container via said supply conduit;
    a rotatably drivable stirring and scraping mechanism disposed in said cylinder;

an inlet chamber located on one end of said cylinder, said supply conduit discharging into said inlet chamber;

a discharge valve located on the other end of said cylinder;

a heater for pasteurizing the starting mixture, said heater surrounding only said cylinder;

a thermostat for limiting the wall temperature of said cylinder;

means for transporting the starting mixture from said inlet chamber to said discharge valve; and a connecting conduit having a valve therein, said connecting conduit being disposed between said cylinder, at the end thereof adjacent said discharge valve, and said storage container.

2. An apparatus as defined by claim 1, wherein that said thermostat limiting the wall temperature of the cylinder limits the wall temperature to from 75° C. to 80° C.

3. An apparatus as defined by claim 1, further including pump means, disposed in the storage container upstream of said supply conduit, for transporting the starting mixture from said storage container to said cylinder.

4. An apparatus as defined by claim 1, wherein said cooling or freezing cylinder is disposed below the storage container.

* * * * *